UNITED STATES PATENT OFFICE.

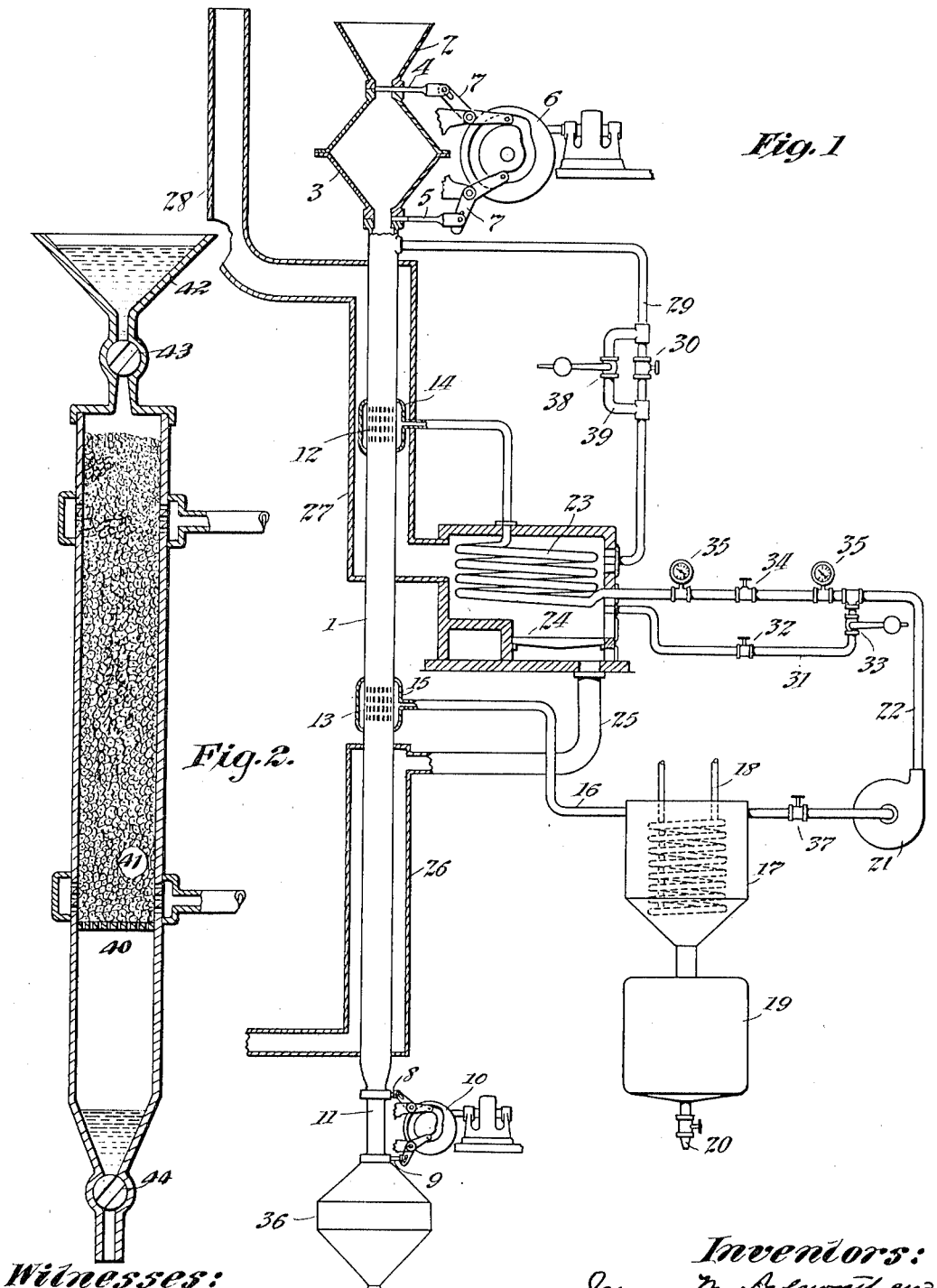

JONAS W. AYLSWORTH, OF EAST ORANGE, AND FRANK L. DYER, OF MONTCLAIR, NEW JERSEY.

APPARATUS FOR DISTILLING LIQUIDS AND FUSIBLE SOLIDS.

1,079,093.   Specification of Letters Patent.   Patented Nov. 18, 1913.

Application filed May 25, 1906.   Serial No. 318,693.

*To all whom it may concern:*

Be it known that we, JONAS W. AYLSWORTH, a citizen of the United States, residing at 223 Midland avenue, East Orange, county of Essex, State of New Jersey, and FRANK L. DYER, a citizen of the United States, residing at Montclair, county of Essex, and State of New Jersey, have invented a certain new and useful Apparatus for Distilling Liquids and Fusible Solids, of which the following is a description.

Our invention relates to an improved apparatus for distilling liquids and fusible solids, and our object is to provide an apparatus for the purpose by which materials may be more effectively, rapidly, perfectly and economically distilled than at present. The process of distillation as practised with our improved apparatus is a continuous one, thereby doing away with the necessity of charging the retort or still from time to time, as is now the case, and obviating the attendant losses in heat during the time of operation.

Our invention is applicable for use in connection with the distillation of a large variety of substances, but more especially it is intended for the distillation of substances which leave a viscid or solid residue and which, if distilled in existing apparatus, persistently retard the escape of the distilled products, and especially after the operation has progressed toward its completion.

The invention is also especially adapted for the distillation of those substances which partly decompose at, or either slightly above or below, their boiling points.

Among those materials which we propose to treat by means of our invention are asphalts, resins, bitumen, tar, mineral waxes, petroleum, fatty acids, oils, glycerin, and other materials of a similar nature.

Speaking broadly, our invention viewed as an apparatus, consists of an extended retort or still, through which material to be distilled is progressively passed (either continuously or by successive feed movements) a distilling zone being formed within the retort and through which the material to be distilled is required to be fed, the distillation within the distilling zone being performed by the continuous movement through the distilling zone in direct contact with the material to be distilled, of the uncondensed gaseous products of the distillation, a blower, pump or equivalent device being employed to effect the circulation of such uncondensed products and a heater being employed for the purpose of raising the temperature of the uncondensed gaseous products sufficiently high to effect a rapid and perfect distillation of the material passing through the distilling zone.

The apparatus also comprises a conducting pipe leading from the retort or still above or at one side of the distilling zone for the purpose of carrying off, and preferably leading to the heater, surplus gases accumulating within the still or retort and not required for distillation purposes.

The apparatus also comprises regenerative means for absorbing heat from the hot residues leaving the distilling zone, and for imparting heat to the material to be distilled while within, and as it approaches the distilling zone, as well as other details of construction by which its operation and efficiency will be improved and increased, all as will be more fully described hereafter.

The apparatus is of such a character as to be capable of use for the distillation of materials either under a diminished pressure below that of the atmosphere, or at an increased pressure above that of the atmosphere, or at atmospheric pressure. In its broad aspect, the invention, viewed as a process, consists in passing the material to be distilled either continuously or intermittently with respect to a substantially confined distilling zone, in maintaining in constant circulation through the distilling zone a flow of gaseous uncondensed products of previous distillation, whereby the distillable products will be evolved from the material and be carried off with the uncondensed gases, in condensing the condensable distillate so as to separate the same from the uncondensed gases and in reheating the uncondensed gases before passing the same again through the distilling zone.

The process also consists in carrying off from the retort the surplus gaseous products accumulating therein, as the process progresses and conducting, preferably, the same to the heater.

The process also preferably consists in passing the air supply to the heater adjacent to and in a direction contrary to the movement of the residue leaving the distilling zone, whereby heat will be absorbed from the same and a conservation in this way effected.

The process also consists in passing the products of combustion from the heater adjacent to and in a direction opposed to the movement of the material entering the distilling zone, whereby such material will be heated before it is acted upon by the distilling media, thereby effecting a further economy.

The process finally comprises details in methods of operation, as will be more fully hereinafter set forth.

We do not however claim the process in this application but it is reserved to form the subject matter of a separate application.

In order that the invention may be better understood, attention is directed to the accompanying drawings forming part of this specification and in which—

Figure 1, is a diagrammatic view, showing an embodiment of an apparatus designed for carrying the process into effect, wherein the refractory material containing the substance to be distilled, is caused to move continuously or intermittently through the distilling zone, and Fig. 2, a modification of an embodiment of the apparatus in which the refractory material is kept stationary in the still, while the substance to be distilled progresses through the distilling zone.

In both views, corresponding parts are represented by the same numerals of reference.

We show a still or retort 1, as being formed of a long metal tube of any suitable cross-section, the bore of which is preferably flared slightly from top to bottom so as to facilitate the progress of the material through the same. We prefer to arrange the still vertically, so as to effect the feed of material by gravity, but it may be obviously inclined or be horizontal, so long as provision is made for properly feeding the material through the same. At the upper end of the still we show a receiving hopper 2, below which is a buffer hopper 3, two gate valves 4 and 5 being arranged as shown, so that when one is open, the other will be closed, thereby preventing a breaking of the seal at the upper end. These gate valves may be operated by a cam 6, and levers 7, as shown, or by any other suitable mechanism. At the lower end of the retort or still are two gate valves 8 and 9, operated by a cam 10 and separated by a section 11 of much smaller capacity than the buffer hopper 3, the idea being to operate the gate valves 8 and 9 intermittently at a comparatively rapid rate so as to secure a relatively uniform feed of material through the still. The distilling zone is that portion of the still located between the perforations 12 and 13, which perforations are surrounded by jackets 14 and 15. From the jacket 15, a pipe 16 leads to a condenser 17 of any suitable type, cooled, for example, by a coil 18 through which water circulates and said condenser being provided with a tank 19 below the same, in which the distillate collects, the latter being removed as desired through a valved draw off pipe 20. In the circulating system, either in front of or behind the condenser (according as the operation is to be performed below or above atmospheric pressure) is a device 21 for maintaining the circulation such, for example, as a blower or a vacuum or pressure pump. From the discharge of the blower or pump, a pipe 22 leads to a heating coil 23, and thence to the jacket 14, surrounding the inlet to the distilling zone. The heating coil 23 is heated by a furnace 24, supplied with air through a pipe 25 from a jacket 26, surrounding the lower portion of the retort or still 1. The combustion gases from the furnace pass through a jacket 27, surrounding the upper part of the retort or still, including preferably also the upper part of the distilling zone. The upper end of the jacket 27 connects with a stack 28. Leading from the upper end of the retort or still is a pipe 29 having a valve 30 therein, and connecting with the furnace 24. This is a relief pipe for the combustion of the surplus gases when the still is to be worked under atmospheric pressure or under a pressure above the atmosphere. Leading from the pipe 22 and connecting also with the furnace is a by-pass 31, having a cut-off valve 32, and preferably also an automatic valve 33 of any suitable type. Between the by-pass 31 and the heater, the pipe 22 is provided with a pressure-reducing valve 34 and on either side of this valve are gages 35 for indicating the pressure in the pipe, as will be understood.

In carrying out our improved process with an apparatus such as that which is described, we make use of particles or lumps of a suitable refractory material, such as coke, crushed fire-brick, pumice-stone, charcoal, etc., the particles preferably varying in size, say from $\frac{1}{2}''$ to an inch or more in diameter. These lumps or particles in the case of a liquid to be distilled, are saturated with the liquid, either before being introduced in the hopper 2, or the liquid to be distilled is added to the lumps or particles in the hopper 2, or buffer 3, or within the still itself, the only desideratum being that as the lumps or particles pass through the distilling zone, they shall be saturated with, and carry with them absorbed within their pores, the liquid to be distilled. In the case of distillable solid matter, such as asphalt, the latter is pulverized more or less finely, and intimately mixed with the lumps, preferably before the latter are introduced within the hopper 2. In the latter case the lumps serve to separate the particles of distillable solid matter so as to permit a circulation of uncondensed gases through the same, as will be understood. By operating the two series of gates 4 and 5, and 8 and 9, successive charges of material will be introduced within the retort at the upper end and withdrawn from the same at the lower end, the material passing slowly through the distilling zone, and carrying with it the material to be distilled either as an absorbent within its pores, or as a solid matter separated by the lumps of undistillable material.

Assuming the apparatus to be working under normal pressure, the valve 32 and the by-pass 31 will be closed and the valves 30 and 34 will be opened to the full extent and the blower or pump 21 will be started so as to maintain a circulation through the heating coil 23, distilling zone, and condenser 17. When the operation is started, air will be thus circulated through the distilling zone and being heated to the desired temperature in the heater, will carry off the distillable products from the material to be distilled, which will be condensed in the condenser 17 and accumulate in the tank 19. The circulating media will become rapidly charged with uncondensed gases from the material which will accumulate in the still and be conducted by the pipe 29 into the furnace, where they will be burned.

Very shortly after the operation starts, all the air originally in the apparatus will be so diluted with gases as to be practically all consumed, so that the successive operation will be performed wholly by the circulation of the non-oxidizing uncondensed gases evolved from the distillable material. With some materials carrying large quantities of gaseous hydrocarbons, the volume of gas thus applied to the furnace for consumption will be sufficient to supply all the heat necessary for operating the heater, and in case the surplus gases thus evolved are more than sufficient for this purpose, they may be suitably collected and used industrially in any desired manner. The air entering the furnace, passing through the jacket 26 abstracts heat from the exhausted material so as to cool the latter and effect a conservation of energy in this respect. Similarly, the products of combustion from the furnace passing through the jacket 27 impart heat to the material, so that when the latter reaches the distilling zone, it will be hot and therefore in an effective condition for rapid distillation. We preferably employ a cooling chamber 36 at the lower end of the still for accumulating charges of exhausted material therefrom, and permit a further cooling of the same before passing into the atmosphere, although obviously, this chamber may be dispensed with.

When the apparatus is to be operated under an increased pressure, above that of the atmosphere, a valve 37 between the inlet to the blower or pump 21, and the still is partly closed, so as to permit pressure to accumulate within the still to an extent dependent upon the degree to which the valve 37 is closed. The pressure within the still will therefore rise to any desired point. When this operation is performed the valve 30 is closed and the pressure within the still is relieved when it reaches the desired point by a relief valve 38 arranged in a by-pass 39 around the valve 30, as shown. When the device is to be used under a diminished pressure, the valve 30 is closed and the valves 32 and 37 are opened. The valve 34 is now adjusted so as to give the desired degree of vacuum within the still, the excess gases being discharged past the relief valve 33 into the furnace through the by-pass 31. Preferably when the device is operated under a diminished pressure the blower or pump 21 is arranged between the still and the condenser 17, so that the condensation will take place under pressure, as in that way a much more perfect condensation can be effected than if the pump were made to condense under more or less of a vacuum. After the lumps of undistillable material are discharged from the still or retort, it may be again charged with material to be distilled until all the pores thereof become clogged with the residuum of the latter, so that it can no longer be effectively used as a vehicle for conducting the distillable material through the distilling zone. When this point is reached, this material may be consumed as fuel in the furnace or elsewhere, or if it is a refractory substance such as firebrick, the combustion residuum in its pores may be burned out in the same way, after which the material may be used over and over again.

It is not strictly necessary in carrying our process into effect that the lumps of material shall progress through the distilling zone carrying the material to be distilled with it, since in the case of liquid material, such as oils or glycerin, a charge of these lumps may be maintained permanently within the distilling zone, the liquid to be distilled being fed continuously to the same, so as to pass slowly down through the distilling zone and be subject to the effects of the heated circulating gases. Such an arrangement is shown in Fig. 2, wherein we illustrate a screen 40 at the lower end of the distilling zone for supporting the charge 41 of undistillable material. In this case, the material to be distilled is fed to a tank 42 from which it is drawn through a valve 43, so as to enter the still and pass slowly through the lumps of undistillable material, the residuum being drawn off at the bottom through a gate or valve 44. It will be evident that with the arrangement shown in Fig. 2, the operation of maintaining the circulation of distillable gases will be the same as the process described in connection with Fig. 1. The charge of undistillable material will be removed as soon as the same becomes fully impregnated with residuum from the distillable liquid, a new charge being then introduced and the operations progressing as before.

Having now described our invention, what we claim as new and desire to secure by Letters Patent is as follows:

1. A distilling apparatus comprising an elongated still having means between its ends for admitting heated gases thereinto and means at another point between its ends for discharging the heated gases carrying the vaporized distillate therefrom, means surrounding the still for heating the still and for heating the gases before their admission into the still, substantially as set forth.

2. A distilling apparatus comprising in combination a substantially closed still, a circulation system including a portion of said still and a coil, means for maintaining a circulation of gases through said system, and means surrounding the still for heating the still and the coil, substantially as set forth.

3. In a distilling apparatus, the combination with a substantially closed still, a portion of which is formed as a distilling zone, through which is maintained a circulation of uncondensed products of previous distillation, a body of loosely arranged undistillable material within the still offering interstices to permit the circulation of uncondensable products, the material to be distilled being supplied to said body, means for maintaining the circulation and a heater for heating the still and the uncondensed products before their re-admission to the distilling zone, substantially as set forth.

4. In a distilling apparatus, the combination with a substantially closed still a portion of which is formed as a distilling zone, through which is maintained a circulation of uncondensed products of previous distillation, a body of loosely arranged undistillable material within the still offering interstices to permit the circulation of uncondensable products, the material to be distilled being supplied to said body, means for maintaining the circulation, a heater for heating the still and the uncondensed products before their re-admission to the distilling zone, and a condenser interposed in the circulating path for condensing the condensable products of distillation, substantially as set forth.

5. A distilling apparatus, comprising in combination a substantially closed still through which a circulation of uncondensed products of previous distillation is maintained, means for progressing the material to be distilled through the still, so as to be acted upon by such uncondensed products, means for maintaining the circulation through the still, means for heating the still and the uncondensed products before the latter again enter the still, and means for conducting to the heater the surplus non-condensable products, substantially as set forth.

6. In a still, the combination of a vertical still, a portion of whose length is formed as a distilling zone, means for maintaining a circulation of uncondensed products of distillation through said distilling zone, means for effecting such circulation, a condenser in the circulating path for condensing and separating the condensable from the non-condensable products of distillation, a heater for heating the non-condensable products before they again pass to the distilling zone, and means for introducing to the upper end of the kiln and through the distilling zone successive charges of non-distillable material carrying the distillable material therewith, substantially as set forth.

7. In a still, the combination of a vertical still, a portion of whose length is formed as a distilling zone, means for maintaining a circulation of uncondensed products of distillation through said distilling zone, means for effecting such circulation, a condenser in the circulating path for condensing and separating the condensable from the non-condensable products of distillation, a heater for heating the non-condensable products before they again pass to the distilling zone, means for introducing to the upper end of the kiln and through the distilling zone successive charges of non-distillable material carrying the distillable material therewith, and means for withdrawing the exhausted non-distillable material and residuum from the kiln at its lower end, substantially as set forth.

8. In a still, the combination of a vertical still, a portion of whose length is formed as a distilling zone, means for maintaining a circulation of uncondensed products of distillation through said distilling zone, means for effecting such circulation, a condenser in the circulating path for condensing and separating the condensable from the non-condensable products of distillation, a heater for heating the non-condensable products before they again pass to the distilling zone, means for introducing to the upper end of the kiln and through the distilling zone successive charges of non-distillable material carrying the distillable material therewith, means for withdrawing the exhausted non-distillable material and residuum from the kiln at its lower end, and a jacket surrounding the kiln above the distilling zone and connected with the said heater, substantially as set forth.

9. In a still, the combination of a vertical still, a portion of whose length is formed as a distilling zone, means for maintaining a circulation of uncondensed products of distillation through said distilling zone, means for effecting such circulation, a condenser in the circulating path for condensing and separating the condensable from the non-condensable products of distillation, a heater for heating the non-condensable products before they again pass to the distilling zone, means for introducing to the upper end of the kiln and through the distilling zone successive charges of non-distillable material carrying the distillable material therewith, means for withdrawing the exhausted non-distillable material and residuum from the kiln at its lower end, and a jacket surrounding the kiln above the distilling zone and connected with said heater, substantially as set forth.

10. In a distilling apparatus, the combination with a vertical kiln, a part of whose length is formed as a distilling zone, means for maintaining through the distilling zone a circulation of uncondensed products of distillation, including piping forming a closed system with said zone, a condenser in the circulating path, a heater for heating the uncondensed products, and a conduit leading from the kiln above the distilling zone and connected with said heater, substantially as set forth.

11. In a distilling apparatus, the combination with a vertical kiln, a part of whose length is formed as a distilling zone, means for maintaining through the distilling zone a circulation of uncondensed products of distillation, a condenser in the circulating path, a heater for heating the uncondensed products, a conduit leading from the kiln above the distilling zone and connected with said heater, a valve in said conduit, a by-pass around said valve and a relief valve in said by-pass, substantially as set forth.

12. In a distilling apparatus, the combination with a vertical still, a portion of whose length is formed as a distilling zone, means for maintaining through the distilling zone a circulation of uncondensed products of distillation, a condenser in the circulating path, a heater for heating the uncondensed products, a reducing valve in the circulating path between the condenser and heater, a conduit for deflecting into the heater the surplus gases accumulating in the circulating path, and a relief valve in said conduit, substantially as set forth.

13. In a distilling apparatus comprising a retort having a distilling zone, means for maintaining a constant flow through the distilling zone of gaseous uncondensed products of previous distillation of the material to be distilled in the retort, means for heating such products before their introduction into the distilling zone, means for progressively feeding the material to be distilled through the distilling zone, means for abstracting heat from the residue of the material after leaving the distilling zone and transferring the same to the means for heating the products, and means for utilizing the heat of the waste gases escaping from the means for heating the products, for heating the material to be distilled before it reaches the distilling zone, substantially as set forth.

14. In a distilling apparatus comprising a retort having a distilling zone, means for progressively feeding material to be distilled through said distilling zone, means for causing distillation within said zone comprising means for circulating continuously through said zone and through the material to be distilled therein, the gaseous products of such distillation, said products circulating through said material in the direction of feed of the latter, means for heating said gaseous products before their entry into the distilling zone, means for abstracting heat from the residue of the material to be distilled after leaving the distilling zone, and transferring the same to the means for heating the gaseous products, and means for utilizing the heat of the waste gases escaping from the means for heating the gaseous products, for heating the material to be distilled before it reaches the distilling zone, substantially as set forth.

15. A distilling apparatus comprising an elongated vertical retort having a distilling zone intermediate its ends, means for progressively feeding material to be distilled through said zone, means for causing distillation within said zone by the continuous cyclic passage therethrough of the gaseous products of such distillation and the reheating of the same before their entry into the distilling zone each cycle, a reheater for reheating said gases, a jacket surrounding the still below the distillation zone, connected with the reheater, a discharge pipe and a jacket surrounding the upper part of said distilling zone connected between the reheater and the discharge pipe, substantially as set forth.

16. A distilling apparatus comprising an elongated still having means between its ends for admitting heated gases thereinto, and means at another point between its ends for discharging the heated gases carrying the vaporized distillate, means for abstracting heat from the residue of the material below the point of distillation and utilizing the same for heating the gases, and means for utilizing surplus heat of said gases for heating said still above the point at which distillation occurs, substantially as set forth.

17. A distilling apparatus comprising an elongated still having means between its ends for admitting heated gases thereinto, and means at another point between its ends for discharging the heated gases carrying the vaporized distillate, and means for abstracting heat from the residue of the material below the point of distillation and utilizing the same for heating the gases, substantially as set forth.

18. A distilling apparatus comprising an elongated vertical still having means between its ends for admitting heated gases thereinto, and means at another point between its ends for discharging the heated gases carrying the vaporized distillate, and means for utilizing surplus heat of said gases for heating said still above the point at which distillation occurs, substantially as set forth.

19. In a distilling apparatus, a vertical retort having means for feeding material to be distilled into the upper end thereof as necessary to maintain the supply, without free admission of air, and means actuated at a more rapid rate than the first means for feeding the residuum through a reduced section of the still at the lower end thereof, substantially as set forth.

20. In a distilling apparatus, a retort, a condenser and a reheater, and means for distilling material in the retort under atmospheric pressure or pressure above or below atmospheric pressure, comprising a circulation system for continuously passing the gaseous products of distillation through the retort, the condenser and the reheater, a pump, pipe, and pressure regulating valves therein, substantially as set forth.

21. In a distilling apparatus, a retort, a condenser, a reheater and a pump, means for distilling the material in the retort under a partial vacuum comprising a circulation system for continuously passing the products of distillation through the retort, the condenser, the reheater and the pump, a passage from the pump to the reheater, a pressure reducing valve therein and a by-pass for discharging the excess gases between the pump and the valve, substantially as set forth.

22. In a distilling apparatus, a retort, a condenser, a reheater and a pump, means for distilling material in the retort under increased pressure, comprising a circulation system for continuously passing the gaseous products of distillation through the retort, the condenser, the reheater and the pump, including a passage conducting the gases from the retort to the pump, a pressure regulating valve therein and a relief valve connected with the retort, substantially as set forth.

This specification signed and witnessed this 24th day of May, 1906.

JONAS W. AYLSWORTH.
FRANK L. DYER.

Witnesses to signature of Jonas W. Aylsworth:
ANNA R. KLEHM,
JOHN A. BOEHM.

Witnesses to signature of Frank L. Dyer:
FRANK D. LEWIS.
MARY J. LAIDLAW.